United States Patent [19]

Kashimura

[11] Patent Number: 5,731,845
[45] Date of Patent: Mar. 24, 1998

[54] METHOD AND APPARATUS FOR CORRECTING CONTOUR OF COLOR IMAGE SIGNAL

[75] Inventor: Naoki Kashimura, Tokyo, Japan

[73] Assignee: Ikegami Tsushinki Co., Ltd., Tokyo, Japan

[21] Appl. No.: 639,448

[22] Filed: Apr. 29, 1996

[30] Foreign Application Priority Data

May 16, 1995 [JP] Japan ................. 7-117091

[51] Int. Cl.⁶ .............. H04N 9/66; H04N 5/21; H04N 9/77; H04N 9/78
[52] U.S. Cl. .............. 348/630; 348/663; 348/665; 348/668; 348/640
[58] Field of Search .............. 348/625, 630, 348/631, 665, 667, 668, 670

[56] References Cited

U.S. PATENT DOCUMENTS

| | | | |
|---|---|---|---|
| 4,677,461 | 6/1987 | Mizutani et al. | |
| 5,019,895 | 5/1991 | Yamamoto et al. | 358/36 |
| 5,227,869 | 7/1993 | Degawa | 358/37 |
| 5,285,267 | 2/1994 | Lim | 348/663 |
| 5,291,276 | 3/1994 | Matsumoto et al. | 348/663 |
| 5,517,255 | 5/1996 | Gai et al. | 348/663 |

FOREIGN PATENT DOCUMENTS

| | | |
|---|---|---|
| A-0 530 918 | 3/1993 | European Pat. Off. |
| A-5-103226 | 4/1993 | Japan. |
| A-5-328171 | 12/1993 | Japan. |
| A-2 151 104 | 7/1985 | United Kingdom. |

Primary Examiner—Amelia Au
Assistant Examiner—Nhon T. Diep
Attorney, Agent, or Firm—Oliff & Berridge, PLC

[57] ABSTRACT

A two-dimensional contour enhancement is performed along a plurality of lines on a two-dimensional frequency characteristic chart, the line intersecting with each other at middle points between successive color cross generating regions and not passing through an origin. Then, the contour enhancement can be carried out in a frequency region of 3–4 MHz in which a visual effect of contour enhancement appears most effective, while the enhancement in the cross color generating regions can be suppressed.

7 Claims, 4 Drawing Sheets

FIG_1
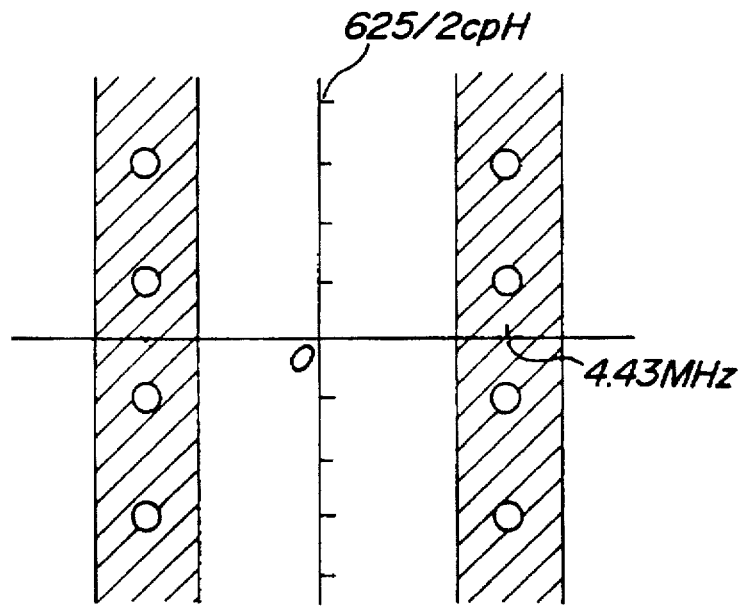
FIG_2
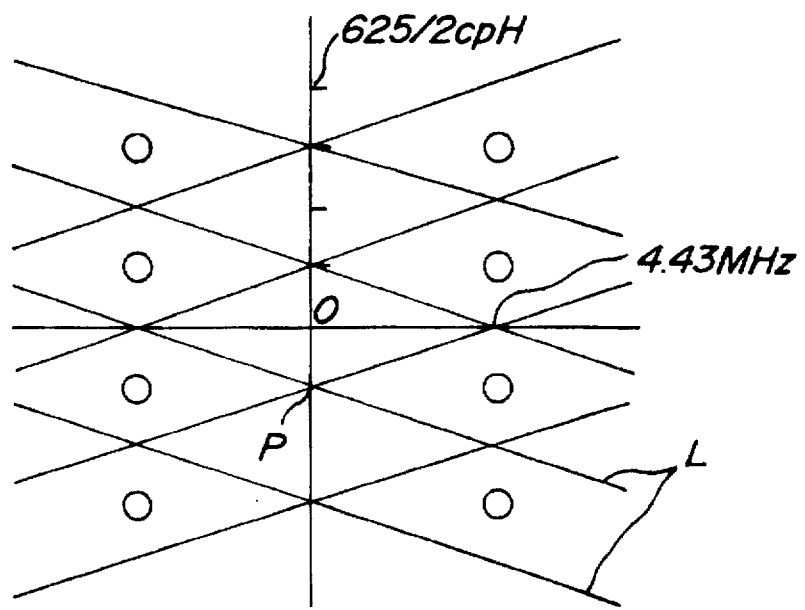

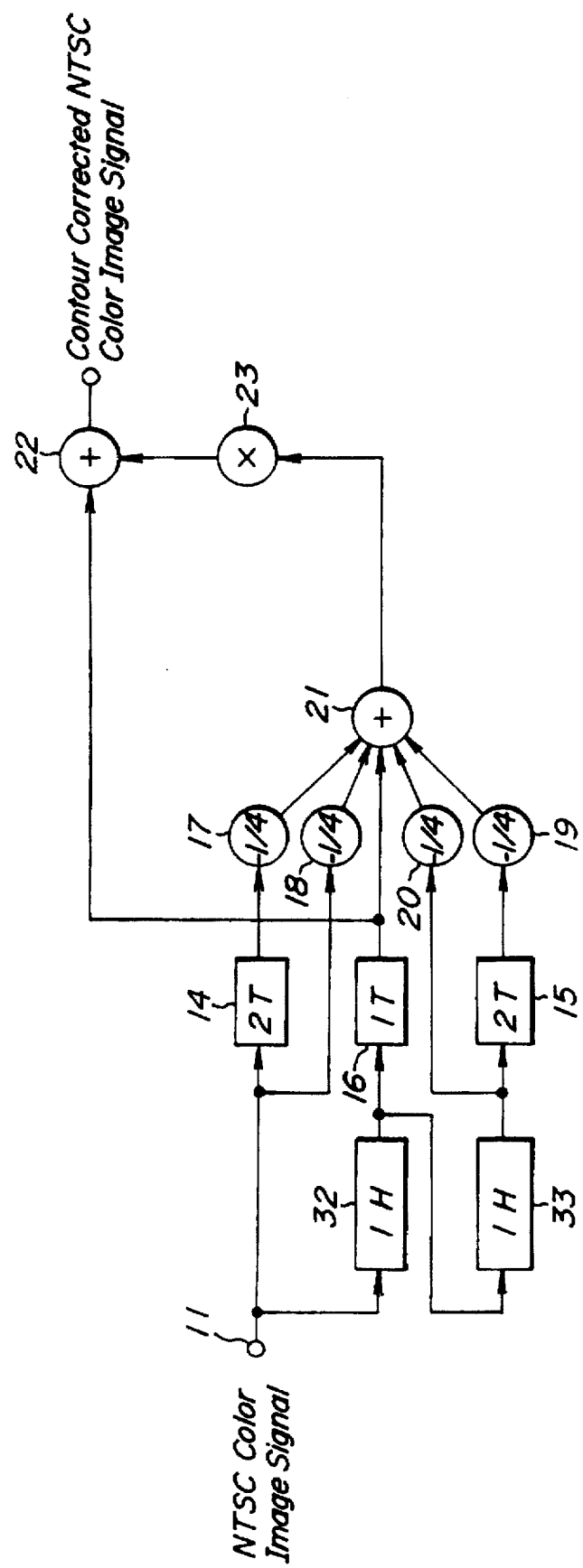
FIG._4

FIG_5
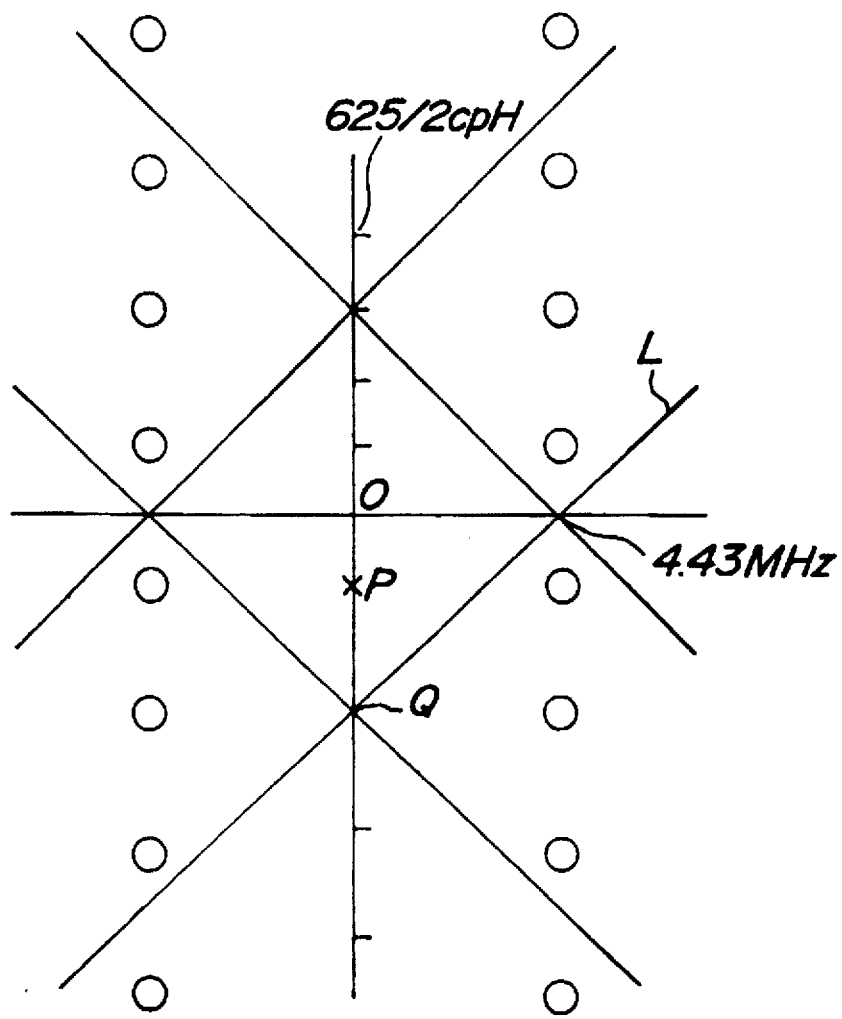

METHOD AND APPARATUS FOR CORRECTING CONTOUR OF COLOR IMAGE SIGNAL

BACKGROUND OF THE INVENTION

1. Field of the Invention

The present invention relates to a method for correcting a contour of a color image signal, and more particularly to a method for correcting a contour of a color television signal in a two-dimensional manner, while a generation of a cross color is suppressed. The present invention also relates to an apparatus for carrying out such a contour correction method.

2. Related Art Statement

As one of problems of a currently used color television system, there has been a problem of a cross color. For instance, in the NTSC color television system, a comb filter method and a three-dimensional YC separation method have been proposed for suppressing a cross color. However, in the PAL system, there has not been proposed an effective method for suppressing a cross color due to a complicated relation between a color subcarrier frequency and a horizontal frequency.

The above mentioned comb filter method and three-dimensional YC separation method could not be performed on a transmitter side, but could be carried out only on a receiver side. Moreover, in the comb filter method, a luminance signal Y and a color signal C are separated from each other by utilizing a fact that a color subcarrier frequency component has a phase difference of 180° C. between successive lines. Therefore, this contour correction method is effective only for an image signal having purely a horizontal component, but is not effective at all for an image signal of an inclined cross color region, because at the receiver end, the image signal of the inclined cross color region could not be differentiated from the color subcarrier signal.

In the three-dimensional YC separation method, the luminance signal and the color signal can be separated from each other in an ideal fashion for a still picture, but for a moving picture, the above mentioned problem in the comb filter method occurs.

Moreover, the above mentioned cross color suppression methods are performed exclusively at the receiver side having corresponding function, so that receivers are limited.

For the color television signal, a contour correction has to be carried out. This contour correction could not be dispensed with in view of a visual enhancement. A frequency range within which the visual enhancement can be actually attained by the contour correction is dependent upon individual persons, but in general, a frequency range of 3–4 MHz is used for a currently available color television system such as NTSC system and PAL system. This frequency range corresponds to a frequency range of the color subcarrier. As stated above, in order to remove the cross color, this frequency range has to be suppressed as far as possible. That is to say, in a view point of the removal of the cross color, the above mentioned frequency range has to be suppressed, but in a view point of the contour enhancement, this frequency range has to be enhanced as far as possible.

SUMMARY OF THE INVENTION

The present invention has for its object to provide a novel and useful method for correcting a contour of a color television signal, in which the above mentioned conflicting problems can be effectively solved, the cross color can be effectively suppressed even in a range which could not be corrected at a receiver side, and the contour enhancement can be performed for the frequency range of 3–4 MHz in which the contour enhancement can be performed most effectively in a view of visual enhancement.

According to the invention, a method for correcting a contour of a color television signal, characterized in that upon considering a two dimensional frequency characteristic chart having an origin at a center, a horizontal axis of a horizontal frequency and a vertical axis of a vertical frequency, a two dimensional contour enhancement is carried out along a plurality of lines on the two dimensional frequency chart, said lines not passing through the origin and intersecting with each other at substantially middle points between successive cross color generating regions which appear discretely along lines parallel with the vertical axis and passing through color subcarrier frequency points on both sides of the origin on the horizontal axis.

It is another object of the invention to provide a novel and useful apparatus for correcting a contour of a color television signal.

According to the invention, an apparatus for correcting a contour of a color television signal of the PAL system comprises:

a first delay means for delaying an input color image signal for a two line period to produce a two-line delayed color image signal;

a second delay means for delaying the two-line delayed color image signal for a two line period to derive a four-line delayed color image signal;

a third delay means for delaying said input color image signal for 2T to derive a 2T delayed color image signal, where $T=\frac{1}{2}f_{sc}$ and $f_{sc}$ is a color subcarrier frequency;

a fourth delay means for delaying said four-line delayed color image signal derived from said second delay means for 2T to generate a four-line plus 2T delayed color image signal;

a fifth delay means for delaying said two-line delayed color image signal for T to produce a two-line plus T delayed color image signal;

a first mixing means for mixing the two-line delayed color image signal from said first delay means, the four-line delayed color image signal from said second delay means, the 2T delayed color image signal from said third delay means, the four-line plus 2T delayed color image signal and the two-line plus T delayed color image signal from said fifth delay means at a predetermined ratio to derive a contour correcting signal; and a second mixing means for mixing said contour correcting signal with the input color image signal to derive a contour corrected color image signal by escaping cross color generating regions.

According to the invention, an apparatus for correcting a contour of a color image signal of the NTSC system comprises:

a first delay means for delaying an input color image signal for an one-line period to produce an one-line delayed color image signal;

a second delay means for delaying the one-line delayed color image signal for an one-line period to derive a two-line delayed color image signal;

a third delay means for delaying said input color image signal for 2T to derive a 2T delayed color image signal, where $T=\frac{1}{2}f_{sc}$ and $f_{sc}$ is a color subcarrier frequency;

a fourth delay means for delaying said two-line delayed color image signal derived from said second delay means for 2T to generate a two-line plus 2T delayed color image signal;

a fifth delay means for delaying said one-line delayed color image signal from said first delay means for 2T to produce an one-line plus 2T delayed color image signal;

a first mixing means for mixing the one-line delayed color image signal from said first delay means, the two-line delayed color image signal from said second delay means, the 2T delayed color image signal from said third delay means, the two-line plus 2T delayed color image signal from said fourth delay means and the one-line plus 2T delayed color image signal from said fifth delay means with each other at a predetermined ratio to derive a contour correcting signal; and a second mixing means for mixing said contour correcting signal with the input color image signal to derive a contour corrected color image signal for which a two-dimensional contour correction is performed by escaping cross color generating regions.

In the contour correcting method and apparatus according to the invention, the two-dimensional contour enhancement is carried out along a plurality of lines on the two-dimensional frequency characteristic chart in which the horizontal frequency is plotted on the horizontal axis and the vertical frequency is plotted on the vertical axis, said plurality of lines not passing through the origin of the two-dimensional frequency characteristic chart and intersecting with each other at substantially middle points between successive cross color generating regions which appear discretely along lines which extend in parallel with the vertical axis and pass through the color subcarrier frequency points appearing on both side of the origin on the horizontal axis. Therefore, the contour enhancement can be performed in such a manner that the contour enhancement in the cross color generating regions is effectively suppressed. Although a known contour enhancement method may be presumed to be a quasi-two-dimensional contour enhancement, the contour enhancement is conducted separately in the horizontal and vertical directions. Therefore, the known method could not be a genius two-dimensional contour enhancement, and thus it is impossible to perform the effective contour enhancement by escaping the cross color generating regions.

Moreover, according to the invention, it is possible to suppress the cross color in the regions in which the known comb filter method and three-dimensional YC separation method could not suppress the cross color. Further, according to the invention, even when a receiver side does not include the cross color suppressing means, it is possible to suppress the cross color.

BRIEF DESCRIPTION OF THE DRAWINGS

FIG. 1 is a schematic view for explaining a known contour correcting method;

FIG. 2 is a schematic view illustrating an embodiment of the contour enhancing method according to the invention;

FIG. 4 is a block diagram denoting an embodiment of the contour enhancing apparatus according to the invention applied to the NTSC system; and FIG. 5 is a schematic view representing another embodiment of the contour enhancing method according to the invention.

DESCRIPTION OF THE PREFERRED EMBODIMENTS

Figure 3:
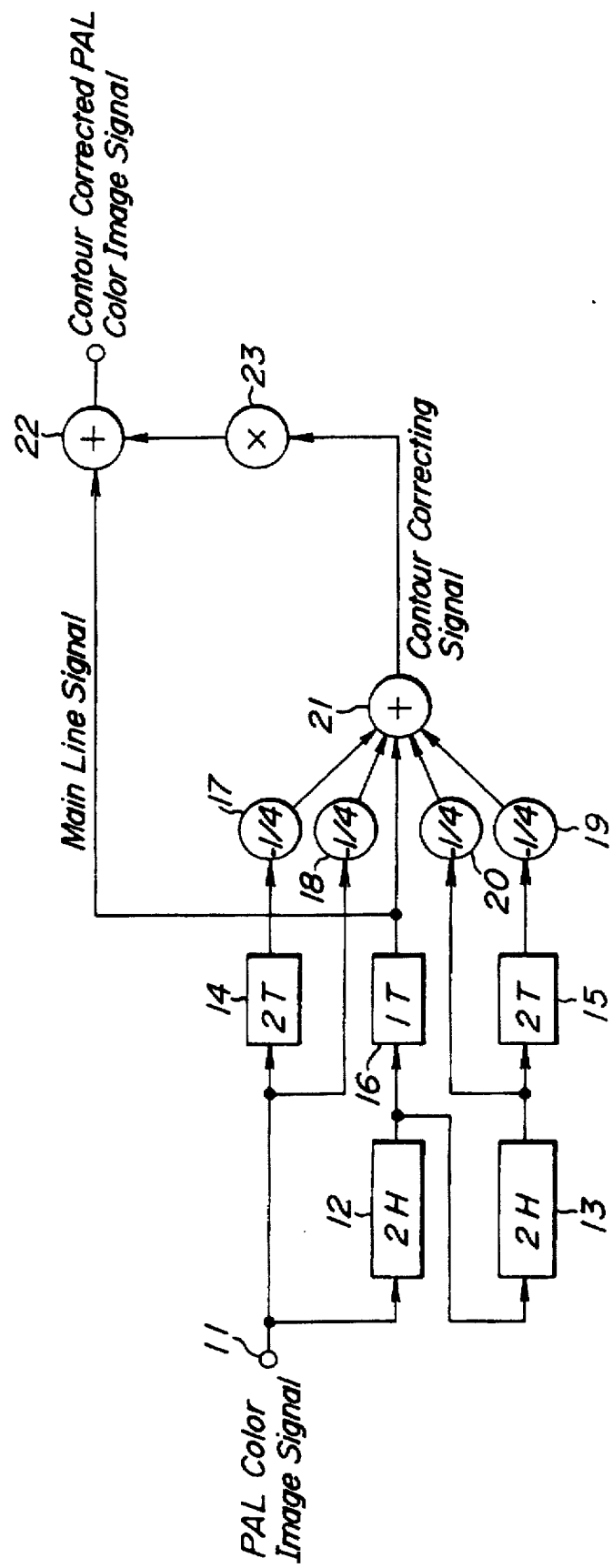
FIG. 3 is a block diagram depicting an embodiment of the contour enhancing apparatus according to the invention applied to the PAL system.

FIGS. 1 and 2 are schematic views showing two-dimensional frequency charts for explaining a principal conception of the contour correcting method according to the invention. On the two-dimensional frequency characteristic chart, a horizontal frequency is plotted on a horizontal axis, a vertical frequency is plotted on a vertical axis, and an origin is plotted on a center. On the vertical axis, the vertical frequency is represented by cycle per height (cpH). Such a frequency characteristic chart is also called a circular zone plate chart and has been widely used for estimating a quality of a displayed image.

Now it is assumed that the contour of a PAL system color image signal is to be corrected. In the PAL system, when a horizontal frequency is represented by $f_H$, a color subcarrier frequency $f_{sc}$ may be expressed as follows:

$$f_{sc}=(284-\tfrac{1}{4})f_H+25 \text{ Hz} \tag{1}$$

In practice, $f_{sc}=4.43361875$ MHz. Therefore, regions in which undesired cross color occurs appear discretely as illustrated by circles in FIGS. 1 and 2. On the other hand, regions in which a high visual effect of the contour enhancement can be attained appear in cross-hatched band-like regions. It should be noted that the cross color regions are included within the high visual effect regions. In known contour correcting methods, the contour enhancement is carried out in the high visual effect regions, and thus the cross color generating regions are also enhanced.

According to the invention, a two dimensional contour enhancement is carried out along a plurality of lines L on the two dimensional frequency chart as shown in FIG. 2. Said lines L do not pass through the origin O and intersect with each other at substantially middle points between successive cross color generating regions denoted by circles which appear discretely along lines parallel with the vertical axis and passing through color subcarrier frequency points of 4.43 MHz on both sides of the origin on the horizontal axis. Therefore, according to the invention, the two-dimensional contour enhancement of high visual effect can be performed in frequency regions of 3–4 MHz, while the contour enhancement is not effected in the cross color generating regions.

FIG. 3 is a block diagram showing an embodiment of the contour correcting apparatus according to the invention. To an input terminal 11 is supplied a PAL system color image signal whose contour is to be corrected. The input color image signal is divided into a first and a second color image signals. The first color image signal is supplied to a first two-line (2H) delay circuit 12 to derive a two-line delayed color image signal. It should be noted that H is a horizontal period and amounts to 64 micro seconds in the PAL system. The thus obtained 2H delayed color image signal is supplied to a second 2H delay circuit 13 to derive a four-line (4H) delayed color image signal. The second input color image signal is further divided into two color image signals, and one of them is supplied to a third 2T delay circuit 14 to derive a color image signal delayed by a period of 2T, wherein T is represented by $\tfrac{1}{2}f_{sc}$, while $f_{sc}$ is a color subcarrier frequency. In the PAL system, the period T amounts to about 113 nano seconds. The 4H delayed color image signal derived from the second 2H delay circuit 13 is divided into two signals, and one of them is supplied to a fourth 2T delay circuit 15 to produce a 2H+2T delayed color image signal. Furthermore, the 2H delayed color image signal derived from the first 2H delay circuit 12 is supplied to a fifth 1T delay circuit 16 to derive a 2H+T delayed color image signal.

The 2T delayed color image signal derived from the third 2T delay circuit 14 is supplied to a first gain adjusting circuit 17, in which a polarity of the color image signal is inverted and a gain of the color image signal is reduced to a fourth of that of the input color image signal supplied to the input terminal 11. The input color image signal is supplied to a second gain adjusting circuit 18, in which a polarity is inverted and a gain is reduced to a fourth. The 4H+2T delayed color image signal derived from the fourth 2T delay circuit 15 is supplied to a third gain adjusting circuit 19 and a polarity of the color image signal is inverted and a gain is reduced to a fourth of that of the input color image signal. The 4H delayed color image signal derived from the second 2H delay circuit 13 is supplied to a fourth gain adjusting circuit 20, in which a polarity is inverted and a gain is decreased into a fourth of the input color image signal.

The color image signals each having the inverted polarity and the gain reduced to a fourth of that of the input color image signal appearing at the input terminal 11 are then supplied to a second mixing circuit 21 together with the 2H+1T delayed color image signal derived from the fifth 1T delay circuit 16 without inverting a polarity with a gain of 1. It should be noted that the 2H+1T delayed color image signal is used as a main color image signal. Then, the mixing circuit 21 produces a contour correcting signal for enhancing a contour in a frequency region of 3–4 MHz, while the contour enhancement in the cross color generating regions can be effectively avoided.

The main color image signal obtained by delaying the input color image signal by 2H by the first 2H delay circuit 12 and by delaying the 2H delayed color image signal by 1T by the fifth 1T delay circuit 16 is supplied to a second mixing circuit 22 to which the above mentioned contour correcting signal derived from the first mixing circuit 21 is also supplied via a fifth gain adjusting circuit 23. In this manner, from the second mixing circuit 22, there is derived a contour corrected PAL color image signal.

In the contour correcting apparatus shown in FIG. 3, the two-dimensional contour enhancement is carried out along the lines L shown in FIG. 2. Now the line L will be further considered in detail. In FIG. 2, coordinates of the cross color generating regions denoted by circles may be expressed in the following manner.

(n1/(2×T), 625×n2/8), wherein n1=±1, ±3, ±5, ±7 - - - n2=±1, ±3, ±5, ±7 - - -

Then coordinates of the middle points between successive cross color generating regions may be represented as follows:

(m/(2×T), 625×n/8), wherein m=0, ±2, ±4, ±6 - - - n=±, ±3, ±5, ±7 - - -

Therefore, the lines L may be expressed by straight lines passing through the above middle points and having the following inclinations:

$$\pm \frac{625/8}{1/2 \times T} = \frac{625 \times T}{4}$$

In practice, the two-dimensional contour enhancement is carried out along cosine curves having crests on said lines and bottoms represented by the following coordinates:

(n1/(2×T), 625×n2/8), wherein n1=±1, ±3, ±5, ±7 - - - n2=±1, ±3, ±5, ±7 - - -

FIG. 4 is a block diagram showing an embodiment of the contour correcting apparatus according to the invention for use in the NTSC color television system. The contour correcting apparatus of the present embodiment is substantially identical with the previous embodiment illustrated in FIG. 3 and portions similar to those shown in FIG. 3 are denoted by the same reference numerals. In the present embodiment, the first and second 2H delay circuits 12 and 13 shown in FIG. 3 are replaced by first and second 1H delay circuits 32 and 33, respectively.

In the present embodiment, the NTSC color television signal is treated, so that a delay time H of the first and second 1H delay circuits 32 and 33 are set to 64 micro seconds, a delay time of the third and fourth 2T delay circuits 14 and 15 is set to about 280 nano seconds, and a delay time of the fifth 1T delay circuit 16 is set to about 140 nano seconds.

The present invention is not limited to the embodiments explained above, but many alternations and modifications may be conceived by those skilled in the art within the scope of the invention. For instance, in the embodiment illustrated in FIG. 2, the lines along which the two-dimensional contour enhancement is carried out are set to lines which cross with each other at a middle of successive cross color generating regions and pass through points P on the vertical axis at which lines connecting said cross color generating regions to corresponding cross color generating regions which are symmetric to said successive cross color generating regions with respect to the vertical axis. However, according to the invention, the two-dimensional contour enhancement may be performed along lines which pass through points Q which situate externally with respect to the points P as illustrated in FIG. 5.

As explained above in detail, according to the invention, the two-dimensional contour enhancement can be effected by escaping the cross color generating regions, the contour enhancement can be performed in the frequency regions 1–3 MHz in which the visual effect of the contour enhancement is highest. Moreover, The cross color can be suppressed in the PAL system in which no effective cross color suppressing means has been developed on a receiver side. Further, also in the NTSC system, the cross color in a region in which the cross color could not be suppressed by known means can be effectively suppressed and the contour correction can be applied in regardless of receivers.

What is claimed is:

1. A method for correcting a contour of a color image signal, characterized in that upon considering a two-dimensional frequency characteristic chart having an origin at a center, a horizontal axis of a horizontal frequency and a vertical axis of a vertical frequency, a two dimensional contour enhancement is carried out along a plurality of lines on the two-dimensional frequency chart, said lines not passing through the origin and intersecting with each other at substantially middle points between successive cross color generating regions which appear discretely along lines parallel with the vertical axis and passing through color subcarrier frequency points on both sides of the origin on the horizontal axis.

2. A method according to claim 1, wherein said two-dimensional contour enhancement is carried out along lines crossing with each other at the middle points between successive cross color generating regions and passing through points which situate at cross points between the vertical axis and lines which connect said cross color generating regions to corresponding cross color generating regions which are symmetrical to said cross color generating regions with respect to the vertical axis.

3. A method according to claim 1, wherein said two-dimensional contour enhancement is carried out along lines crossing with each other at the middle points between successive cross color generating regions and passing through points which situate at cross points between the vertical axis and lines which connect cross color generating regions situating externally by one with respect to said cross color generating regions to corresponding cross color generating regions which are symmetrical to said cross color generating regions with respect to the vertical axis.

4. A method according to claim 1, wherein said two-dimensional contour enhancement is carried out for a PAL system color television signal along lines which pass through points expressed by $(m/(2\times T), 625\times n/8)$, wherein when a subcarrier frequency is denoted by $f_{sc}$, T is given by $\frac{1}{2}f_{sc}$, $m=\pm 0, \pm 2, \pm 4, \pm 6 \text{ - - -}$ and $n=\pm 1, \pm 3, \pm 5, \pm 7 \text{ - - -}$, and have inclinations of $\pm 625\times T/4$.

5. A method according to claim 1, wherein said two-dimensional contour enhancement is carried out for a PAL system color television signal along lines which pass through points expressed by $(m/(2\times T), 625\times n/8)$, wherein when a subcarrier frequency is denoted by $f_{sc}$, T is given by $\frac{1}{2}f_{sc}$, $m=\pm 0, \pm 2, \pm 4, \pm 6 \text{ - - -}$ and $n=\pm 1, \pm 3, \pm 5, \pm 7 \text{ - - -}$, and have inclinations of $\pm 625\times T/2$.

6. An apparatus for correcting a contour of a color television signal of the PAL system comprising:

a first delay means for delaying an input color image signal for a two line period to produce a two-line delayed color image signal;

a second delay means for delaying the two-line delayed color image signal for a two line period to derive a four-line delayed color image signal;

a third delay means for delaying said input color image signal for 2T to derive a 2T delayed color image signal, where $T=\frac{1}{2}f_{sc}$ and $f_{sc}$ is a color subcarrier frequency;

a fourth delay means for delaying said four-line delayed color image signal derived from said second delay means for 2T to generate a four-line plus 2T delayed color image signal;

a fifth delay means for delaying said two-line delayed color image signal for T to produce a two-line plus T delayed color image signal;

a first mixing means for mixing the two-line delayed color image signal from said first delay means, the four-line delayed color image signal from said second delay means, the 2T delayed color image signal from said third delay means, the four-line plus 2T delayed color image signal from said fourth delay means and the two-line plus T delayed color image signal from said fifth delay means at a predetermined ratio to derive a contour correcting signal; and a second mixing means for mixing said contour correcting signal with the input color image signal to derive a two-dimensionally contour corrected color image signal by escaping cross color generating regions.

7. An apparatus for correcting a contour of a color image signal of the NTSC system comprising:

a first delay means for delaying an input color image signal for an one-line period to produce an one-line delayed color image signal;

a second delay means for delaying the one-line delayed color image signal for an one-line period to derive a two-line delayed color image signal;

a third delay means for delaying said input color image signal for 2T to derive a 2T delayed color image signal, where $T=\frac{1}{2}f_{sc}$ and $f_{sc}$ is a color subcarrier frequency;

a fourth delay means for delaying said two-line delayed color image signal derived from said second delay means for 2T to generate a two-line plus 2T delayed color image signal;

a fifth delay means for delaying said one-line delayed color image signal from said first delay means for 2T to produce an one-line plus 2T delayed color image signal;

a first mixing means for mixing the one-line delayed color image signal from said first delay means, the two-line delayed color image signal from said second delay means, the 2T delayed color image signal from said third delay means, the two-line plus 2T delayed color image signal from said fourth delay means and the one-line plus 2T delayed color image signal from said fifth delay means with each other at a predetermined ratio to derive a contour correcting signal; and a second mixing means for mixing said contour correcting signal with the input color image signal to derive a contour corrected color image signal for which a two-dimensional contour correction is performed by escaping cross color generating regions.

* * * * *